April 15, 1969  G. E. PETERSON ET AL  3,438,578
FLEXIBLE DRINKING TUBE
Filed June 1, 1967  Sheet 1 of 2
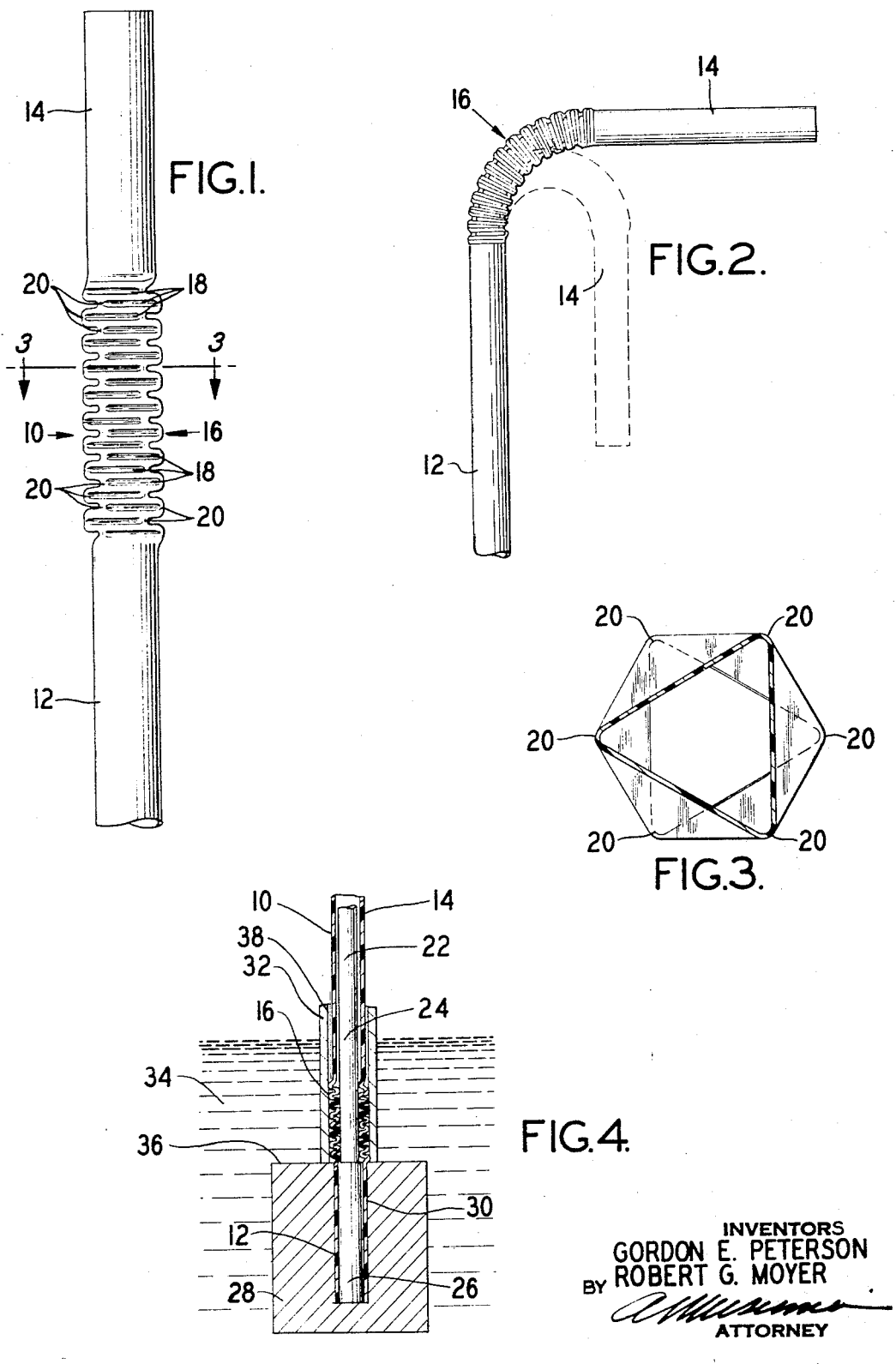
INVENTORS
GORDON E. PETERSON
ROBERT G. MOYER
BY
ATTORNEY April 15, 1969

G. E. PETERSON ET AL 3,438,578

FLEXIBLE DRINKING TUBE

Filed June 1, 1967

INVENTORS
GORDON E. PETERSON
BY ROBERT G. MOYER

ATTORNEY

United States Patent Office 3,438,578
Patented Apr. 15, 1969

3,438,578
FLEXIBLE DRINKING TUBE
Gordon E. Peterson, Lakewood, Ohio, and Robert G. Moyer, Ridgefield, Conn., assignors to Union Carbide Corporation, a corporation of New York
Filed June 1, 1967, Ser. No. 642,929
Int. Cl. A47g 21/18; A61j 15/00
U.S. Cl. 239—33                               5 Claims

ABSTRACT OF THE DISCLOSURE

A drinking tube made from thermoplastic material with a flexible zone intermediate its ends which is formed by providing a plurality of circumferential grooves with axial folds in a particular configuration. The method of forming the flexible zone involves axially crushing the tube with or without the application of heat.

The present invention pertains to drinking tubes or straws, and more specifically to provision of a flexible zone in tubes formed of thermoplastic material.

Background of the invention

Flexible drinking straws have found consumer acceptance and utility, and their use may be particularly commodious when imbibing fluids such as ordinary beverages, under awkward, cumbersome conditions. Heretofore, flexible straws have been made largely of paper and like materials, and a variety of structural configurations and manufacturing methods have been proposed and utilized in connection with providing flexibility in such paper straws. With the advent of thermoplastic materials, such as polypropylene, and their utilization in the manufacture of drinking tubes, a need arises for improved techniques and structures in the formation of a flexible zone in these tubes. The techniques and configurations proposed in connection with paper straws have been found inappropriate in connection with formation of a flexible thermoplastic drinking tube. For many reasons, the difference in the characteristics of the materials involved makes problematic the achievement of acceptable results. Furthermore, thermoplastic materials comprise inherent characteristics which make possible the attainment of a superior product having improved features not only of a practical and utilitarian nature, but also providing a more attractive consumer item having enhanced marketability. However, in order to adequately develop the product potential of flexible thermoplastic drinking tubes, new, especially suitable approaches to the formation of a flexible zone must be provided.

Accordingly, it is an object of the present invention to provide an improved flexible tube, particularly a drinking tube, which is especially adapted for advantageous utilization of thermoplastic material.

Summary of the invention

Briefly, the present invention involves a thermoplastic drinking tube, as well as a method for its manufacture, including a flexible zone comprising a plurality of circumferential grooves, each groove including in a particular configuration a plurality of axial folds. The flexible zone is formed by axially crushing the tube with or without the application of heat.

The invention provides a flexible drinking tube configuration which is advantageously adaptable to desirable manufacturing techniques. The grooves can be simply and efficiently formed, and mass production methods could probably be readily utilized. Additionally, a consumer product comprising significantly attractive features can be provided.

Brief description of the drawings

A better understanding of the invention may be had by reference to the following detailed description of a preferred embodiment thereof taken in connection with the accompanying drawings wherein:

FIGURE 1 is a view in elevation showing the drinking tube of the present invention;

FIGURE 2 is a view showing the tube in a bent position;

FIGURE 3 is a cross-sectional view taken along the lines 3—3 of FIGURE 1;

FIGURES 4 and 5 are cross-sectional views illustrating the drinking tube of the present invention during formation and showing alternative apparatus which may be utilized therefor; and FIGURE 6 is a cross-sectional view taken along line 6—6 showing in greater detail portions of the apparatus illustrated in FIGURE 5.

Description of the preferred embodiment

Figures 5, 6:
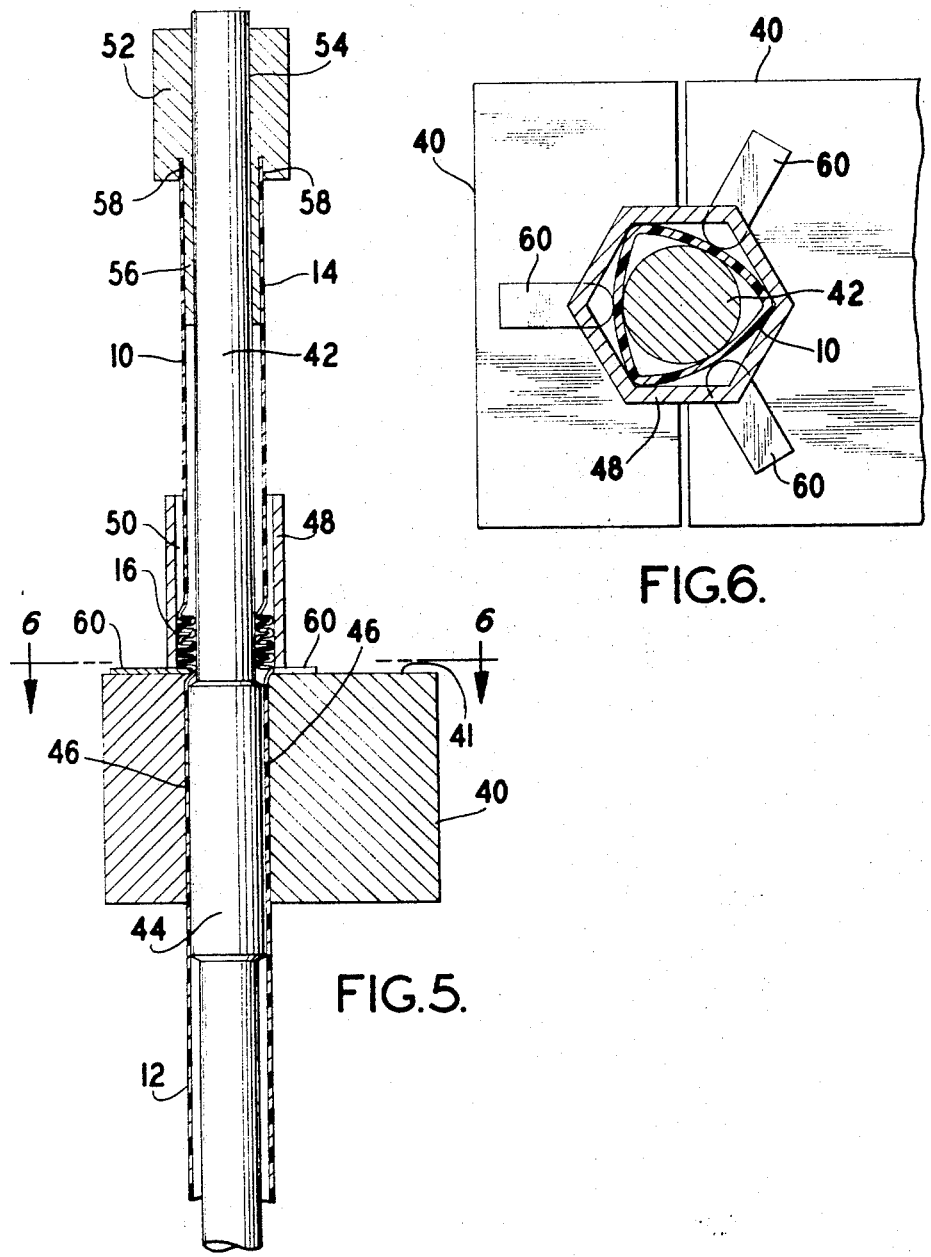

The drawings illustrate a polypropylene flexible drinking tube 10 comprising two straight cylindrical end sections 12 and 14 with a flexible zone 16 therebetween. Although polypropylene is specifically utilized in tube 10 of the preferred embodiment described herein, any suitable thermoplastic such as those categorized as synthetic organic resins, e.g. polyethylene, polystyrene, etc. may be utilized. The flexible zone 16 is comprised of a plurality of discontinuous grooves 18, each of which comprises a plurality of vertical or axial folds 20. In the embodiment illustrated, each groove 18 is formed with three axial folds 20 thereby producing a hexagonal overall exterior configuration in flexible zone 16.

The overall hexagonal configuration of the flexible zone 16 is best illustrated in FIGURE 3, wherein each groove 18, due to the fact that it comprises three axial folds 20, is basically of a triangular configuration when viewed at a transverse cross-section taken at about the center of the groove, such as along line 3—3.

It should be further noted that the axial folds 20 for any given groove 18 are each circumferentially located between a pair of folds 20 in a next adjacent groove 18. The juxtaposition of the triangular configuration of one groove 18 with a next adjacent groove 18 provides the hexagonal shape of the flexible zone 16.

Polygonal shapes other than triangular and hexagonal, respectively, are possible for the cross-sectional view of grooves 18 and for the overall exterior of flexible zone 16, and it will be clear that the specific polygonal shape of the overall exterior of zone 16 depends upon the shape of the cross-sectional view of a groove 18. In this embodiment each groove 18 has a triangular cross-sectional configuration. However, this configuration could be provided in other forms e.g., square, pentagonal, etc. thereby producing a different outer shape for the flexible zone 16. For example, it will be obvious that a square configuration for groove 18 with four axial folds 20 would produce an octagonal outer shape for flexible zone 16. Generally, the number of sides which will characterize the overall outer shape of flexible zone 16 will be twice the number of sides provided in the cross-sectional view of groove 18. Also the number of sides in a cross-sectional view of grooves 18 will in all cases be equal to the number of axial folds 20 provided in a groove. In the manufacture of a flexible tube according to the present invention, the basis for determining the number of sides in any particular configuration may be determined by certain elements pertaining to the method and apparatus for forming the flexible zone 16, and these will be explained in more detail hereinafter.

FIGURE 2 shows the tube 10 in the bent position. This may be accomplished merely by a slight manual pressure, with the tube 10 tending to spring back to the unbent position when pressure is released. The tube may be bent in any direction with equivalent ease, and as indicated by the dotted line illustration of end section 14, the radius of bend may extend through a complete 180° arc from the unbent position.

The present invention also involves the method for manufacturing the drinking tube described. The method basically entails axial crushing of the tube 10 to form the flexible zone 16, and essentially involves the application of an axially compressive force to the tube 10 when it is in the shape of a straight cylindrical non-flexible tube, whereby the tube wall will be caused to collapse and assume the form of the flexible zone 16 described herein. Although several variations of the basic method—which variations will impart different qualitative characteristics to the flexible tube and which may alter the degree of difficulty encountered in the manufacture of a tube—will be described hereinafter, it should be understood that it is considered a basic concept of the present invention that a flexible zone may be formed in a thermoplastic tube merely by applying an axially crushing force to the tube. Although the quality and performance of the end product may vary with refinements, the method in its basic form will produce the elemental result.

One approach for utilizing the method of the present invention is depicted in FIGURE 4, wherein a thermoplastic tube 10 is placed over a mandrel 22 prior to formation of the flexible zone 16. The mandrel 22 comprises an upper, smaller-diameter portion 24 and a lower, larger-diameter portion 26 supported within a lower support member 28. The lower end section 12 of the tube is held within the limited space provided between the cavity in member 28 defined by cylindrical wall 30 and the lower mandrel portion 26. The flexible zone 16 is positioned between the upper portion 24 of mandrel 22 and an outer hexagonal form 32.

In the embodiment depicted in FIGURE 4, heat is applied to the tube during the axial crushing operation. Although the flexible zone 16 may be produced without the application of heat, in accordance with a variation of the method to be described hereinafter, it will be found that the application of heat to the tube during the crushing operation will make the crushing operation easier to perform in that a suitable flexible zone 16 may be achieved with less axial force. Also, the tolerances between the mandrel 22, the form 32 and the support member 28 will be less critical.

Heat may be applied in many appropriate ways either by wet or dry means, or by conduction, radiation, etc. In FIGURE 4 there is shown a liquid heating medium 34 within which the apparatus is submerged. Almost any liquid medium may be used which would not have a deleterious effect upon the submerged elements and which would attain an appropriate temperature while remaining in liquid form. The temperature of the liquid 34 is not critical and in the preferred embodiment shown in FIGURE 4, the temperature of the liquid 34 is maintained between 225° F–250° F.

In order to form the flexible zone 16 depicted in FIGURE 4, it is only necessary to apply a downward force to end section 14. With such a force being applied, the portion of the tube wall situated above the upper wall 36 of support member 28 will crumple or collapse into the desired shape previously described. The lower end section 12, being held and supported between lower portion 26 of mandrel 22 and cylindrical wall 30, will retain its shape when the force is applied. Inasmuch as a spacing 38 is provided between hexagonal outer form 32 and mandrel 22, the walls of the tube 10 are permitted to collapse to form the flexible zone 16.

In forming the flexible zone 16, several expedients are possible with regard to ease of formation, and appearance or regularity of the finished product. One such expedient is the provision of a hexagonal shape for outer form 32. Although the compressed flexible zone 16 will inherently tend to take on a hexagonal shape when crushed, it was found that with a hexagonal form placed around the crushed section during formation a more uniform and regular pattern may be obtained.

Other factors which could affect the results obtained, and which may be varied to obtain varying results, are: variations in the size of the interior mandrel; temperature of the heating bath; and speed at which the tube is crushed.

An important consideration affecting the flexibility of the tube 10 is the depth and sharpness of the grooves 18. In order to obtain greater flexibility, sharper and deeper folds should be provided and it will be noted that in the tube 10 depicted in the drawings, the walls of the tube forming the grooves 18 are bent back upon themselves almost 180°. This may be accomplished by forming a flexible zone 16 of a length which is approximately one half the length of straight or uncrushed section, i.e., a 2½ inch section of tube is axially compressed to form a 1¼ inch flexible zone.

The ease and simplicity of the method described should make possible advantageous utilization of mass production techniques in the manufacture of plastic flexible drinking straws. It will be apparent that many approaches concerning the design and mode of operation of mass production machinery is possible, with heat being provided in any of several appropriate ways, e.g. a spray of hot liquid, a flame or heated air, or by radiant electric means.

An alternative to the method previously described involves crushing the tube 10 without heat to form the flexible zone 16. Such an alternative method is depicted in FIGURES 5 and 6 which illustrate a pair of clamp blocks 40 adapted to firmly hold the lower end section 12 of the tube 10 therebetween. The tube 10 is placed around an inner mandrel having an enlarged diameter section 44, with end section 12 being firmly held between the inner circular walls 46 of blocks 40 and section 44. A hexagonal outer form 48 is positioned around the outer surface of tube 10, with a space 50 being provided between the mandrel 42 and the form 48.

The upper end section 14 of tube 10 is engaged by a force applicator 52 which has an interior cylindrical wall 54 which fits in sliding engagement over mandrel 42, and a smaller-diameter lower section 56 which fits within tube 10. A cylindrical notch defined by walls 58 is adapted to receive the upper end of tube 10 whereby the tube may be firmly held within the notch during the application of the axially crushing force, with section 56 of force applicator 52 cooperating with the notch 58 to provide support to the upper end section 14 of the tube.

Mounted to the upper surface 41 of clamp blocks 40 are three fingers 60 which operate to crimp or radially compress the tube 10 at the point where the flexible zone 16 begins thereby to assist in initiating the formation thereof in a desired configuration.

In the preferred embodiment described herein, a hexagonal overall configuration is described, with a triangular cross-section for groove 18, as depicted in FIGURE 3. The number of fingers 60 provided is determined by the overall shape which is to be imparted to the flexible zone 16. In the preferred embodiment depicted in FIGURE 6, it will be noted that three fingers 60 tend to impart a triangular configuration to the initial groove 18. The action of the fingers 60 and of the hexagonal outer form 48 is to tend to provide a more regular, uniform hexagonal shape for the flexible zone 16. Although it has been found that the tube seems inherently to adapt a hexagonal configuration when axially crushed, the expedients previously described will operate to form a more attractive consumer item by evolving a shape which is more regular, and which may be duplicated with greater uniformity. If it is desired to provide a cross-sectional shape for groove 18 other than triangular, e.g. square, then a number of fingers, e.g. four, appropriate to that shape should be provided.

In the operation of the apparatus shown in FIGURES 5 and 6, an unformed straight cylindrical tube 10 is placed over mandrel 42 and the blocks 40 are brought together and held firmly against the tube 10 thereby clamping the tube to the enlarged diameter portion 44 of mandrel 42. At this point, the fingers 60, which are mounted upon surface 41 of blocks 40 will crimp the tube 10 at the point where the initial groove 18 is to be formed. The hexagonal outer form 48 is then placed over that section of the tube 10 which is to form the flexible zone 16 and subsequently the force applicator 52 is brought into place and an axial force is applied by moving applicator 52 downwardly. The travel distance of applicator 52 will be commensurate with the length of the flexible zone 16 to be produced, and it will be found that better results will be obtained if the applicator 52 is driven throughout its travel in a smooth, steady manner.

As previously stated, several differences will be found to exist in connection with the heat-crush method previously described. With the tube 10 crushed cold, as described in connection with FIGURES 5 and 6, it will be found that closer dimensional control as regards tube size, e.g. outer diameter and wall thickness, will be necessary in order to effect good reproducibility with the crushing action described. Also, in the cold-crush method, reproducibility of the end product will be enhanced by close dimensional control of the fit of the tube around the mandrel 42 and of the outer form 48. It will be found that with the application of heat, as previously described herein, several factors, such as those discussed above, may be eased without impairing the quality of the results.

An additional significant factor concerns the choice of the number of axial folds 20 provided in a groove 18. It was found that the number of axial folds 20 determined the difference between the inner and outer diameter of the flexible zone 16; that is, a lesser number of folds will produce a greater diametral difference and a greater number of folds will produce a lesser diametral difference. Furthermore, it was found that the difficulty of producing a flexible zone 16 increases with an increase in the number of axial folds 20 provided, and that a greater axial force is necessary. Accordingly, the choice of three axial folds 20 for each groove 18, provided in the preferred embodiment described herein, is considered optimum.

What is claimed is:

1. A drinking tube of thermoplastic material having a flexible zone intermediate the ends thereof, said flexible zone comprising a plurality of circumferential grooves, each of said grooves comprising a plurality of axial folds with each fold in a groove being circumferentially positioned between folds in a next adjacent groove.

2. A drinking tube according to claim 1 wherein said grooves extend radially perpendicularly to the axis of said tube, with the sides of said grooves parallel and spaced relatively close.

3. A drinking tube according to claim 1 wherein said flexible zone comprises a polygonal overall outer configuration, with the number of sides in said polygon being twice the number of axial folds in a circumferential groove.

4. A drinking tube according to claim 3 wherein each of said grooves comprises three of said axial folds, said flexible zone being of a hexagonal overall outer configuration.

5. A drinking tube according to claim 1 formed of polypropylene and comprising a thin-walled, small diameter cylinder having said flexible zone extending over a minor portion of its length.

References Cited

UNITED STATES PATENTS

| | | | |
|---|---|---|---|
| 2,094,268 | 9/1937 | Friedman | 239—33 |
| 2,550,797 | 5/1951 | Friedman | 239—33 |
| 3,326,695 | 6/1967 | Neuhauser | 99—138 |
| 3,346,187 | 10/1967 | Mueller | 239—33 |

EVERETT W. KIRBY, *Primary Examiner.*

U.S. Cl. X.R.

215—1; 229—7; 99—138